D. McINTOSH.
CHEMICAL AND ASSAY BALANCE.
APPLICATION FILED AUG. 20, 1921.
1,437,768.  Patented Dec. 5, 1922.
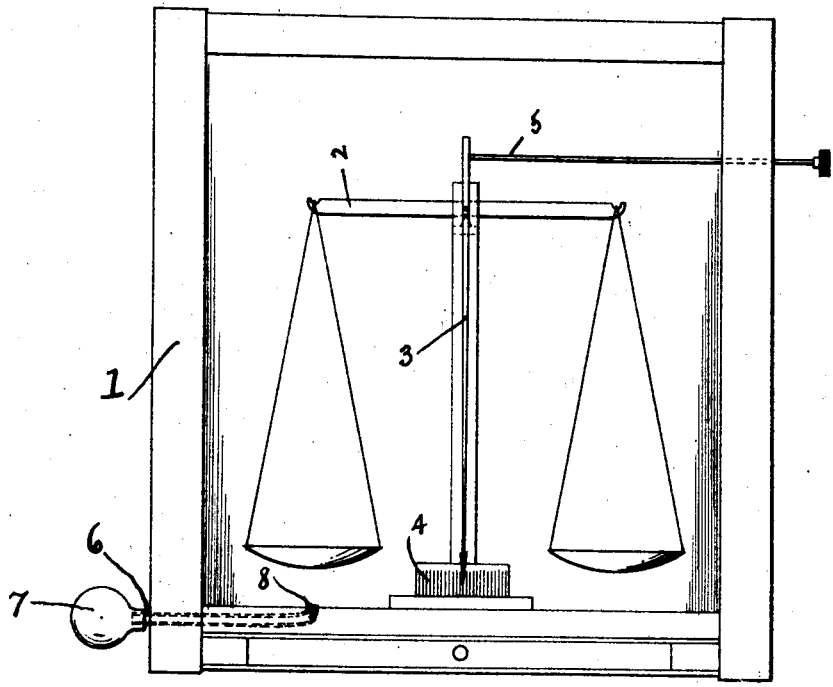
INVENTOR.
Douglas McIntosh
BY
Sheffield & Betts
ATTORNEYS.

Patented Dec. 5, 1922.

1,437,768

UNITED STATES PATENT OFFICE.

DOUGLAS McINTOSH, OF CRANSTON, RHODE ISLAND.

CHEMICAL AND ASSAY BALANCE.

Application filed August 20, 1921. Serial No. 493,931.

*To all whom it may concern:*

Be it known that I, DOUGLAS MCINTOSH, a citizen of the United States, residing at Cranston, Rhode Island, have invented certain new and useful Improvements in Chemical and Assay Balances, of which the following is a disclosure.

In using balances of this kind, there is always a tendency for the moving parts, including the pointer, to swing back and forth when released to such an extent as to make accurate work difficult. In practice, much time is lost in waiting for the swinging to subside or begin. The object of my invention is to provide means by which the user can conveniently and quickly bring the pointer and associated parts to rest or so limit the oscillations as to make accurate weighing possible.

In the accompanying drawing the single figure shows the preferred embodiment of my invention.

Referring in detail to this figure the balance proper including the glass case 1, beam 2, pointer 3, indicating scale 4 and adjusting rod 5 are old and well known and are shown merely for illustration. My improvement resides in the incorporation of the blower 6 as a part of the balance. The rubber bulb 7 of this blower is located outside the housing while the nozzle 8 is disposed directly beneath one of the scale pans. Any excessive swinging of the pointer can easily be prevented by blowing puffs of air on the bottom of the scale pans by compressing the bulb 7.

Having now described my invention what I claim is:

1. In chemical and assay balances comprising a case, a blower fixed to the case and having its discharge nozzle disposed beneath and directly towards one of the scale pans.

2. In chemical and assay balances comprising a case, a blower fixed to the case and having its discharge nozzle disposed beneath and directly towards one of the scale pans, the bulb forming a part of the blower being disposed outside the casing.

DOUGLAS McINTOSH.